Aug. 15, 1967

A. G. TUCCI 3,335,682

POCKET MACHINE

Filed Aug. 13, 1964

INVENTOR
ANTHONY G. TUCCI
BY
*Richard J. Walton*
ATTORNEY

Aug. 15, 1967

A. G. TUCCI 3,335,682

POCKET MACHINE

Filed Aug. 13, 1964

INVENTOR
ANTHONY G. TUCCI
BY
*Richard H. Holton*
ATTORNEY

Aug. 15, 1967

A. G. TUCCI 3,335,682

POCKET MACHINE

Filed Aug. 13, 1964

INVENTOR
ANTHONY G. TUCCI
BY
ATTORNEY

Aug. 15, 1967 A. G. TUCCI 3,335,682
POCKET MACHINE
Filed Aug. 13, 1964 7 Sheets-Sheet 4
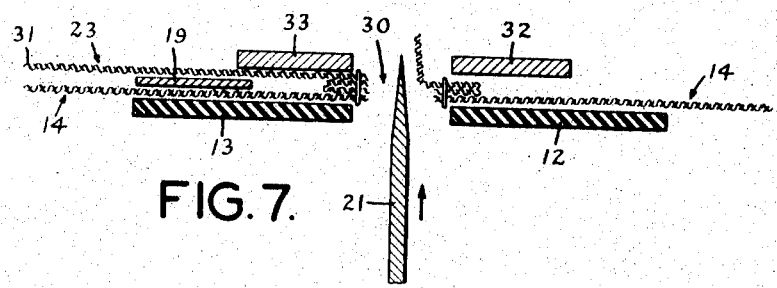
FIG. 7.
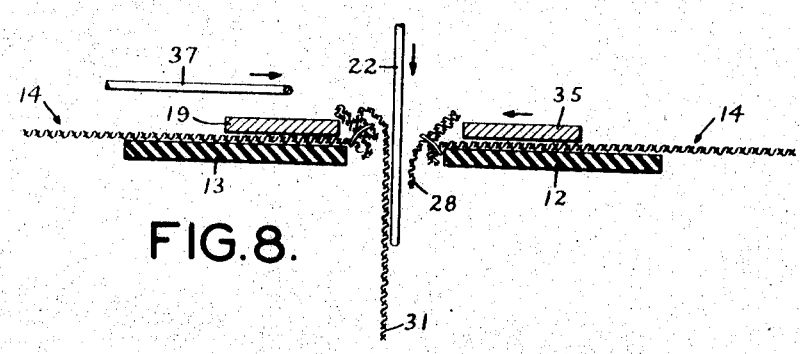
FIG. 8.
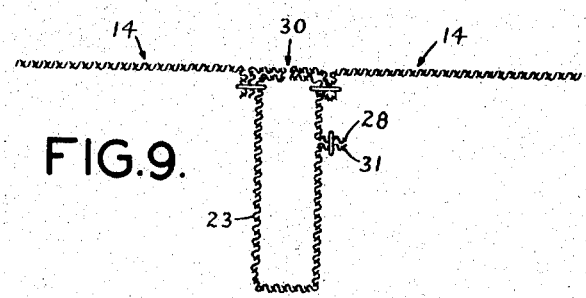
FIG. 9.
FIG. 10.
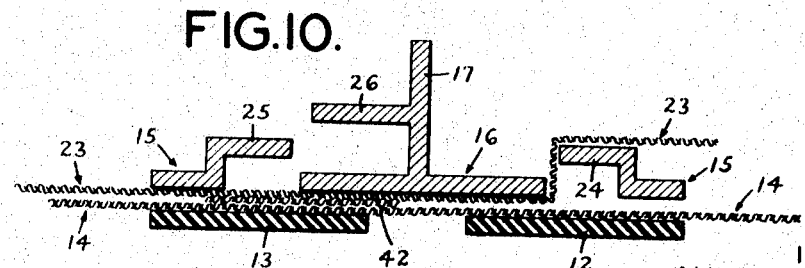
INVENTOR
ANTHONY G. TUCCI
BY
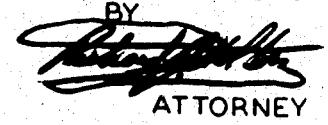
ATTORNEY Aug. 15, 1967   A. G. TUCCI   3,335,682
POCKET MACHINE Filed Aug. 13, 1964   7 Sheets-Sheet 5

INVENTOR
ANTHONY G. TUCCI
BY
ATTORNEY

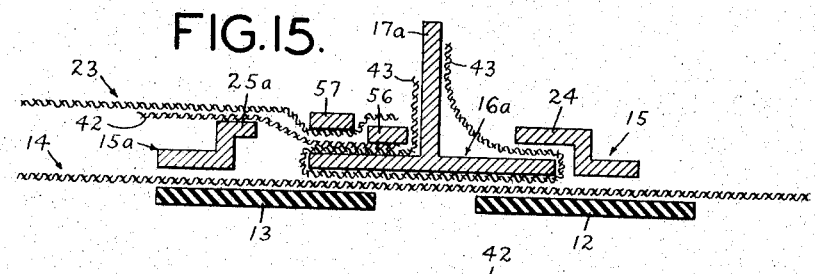
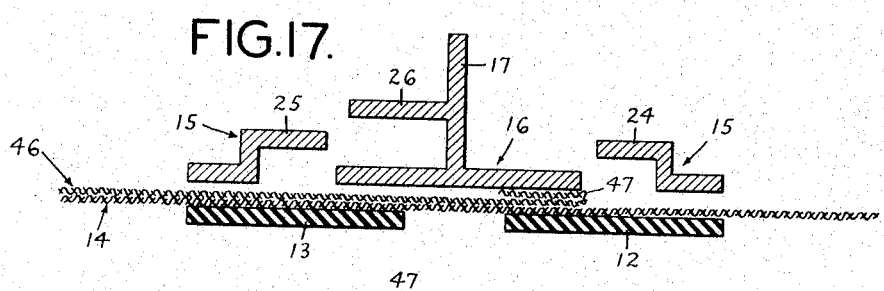
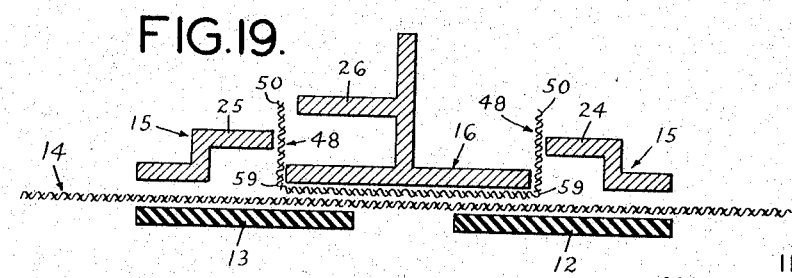
INVENTOR
ANTHONY G. TUCCI
BY
ATTORNEY Aug. 15, 1967  A. G. TUCCI  3,335,682
POCKET MACHINE
Filed Aug. 13, 1964   7 Sheets-Sheet 7
FIG.20.
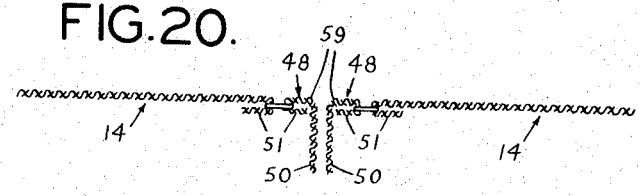
FIG.21.
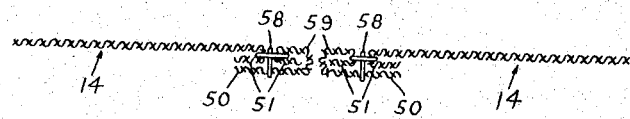
FIG.22.
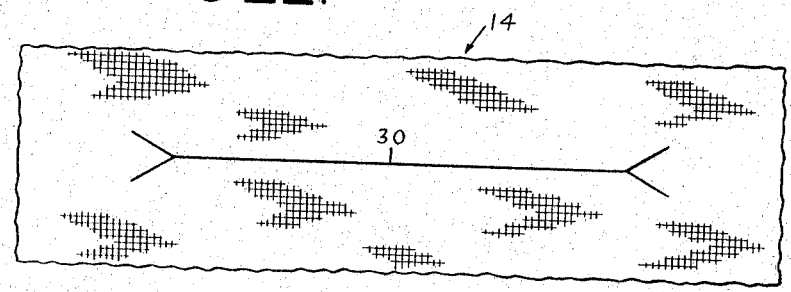
FIG.23.
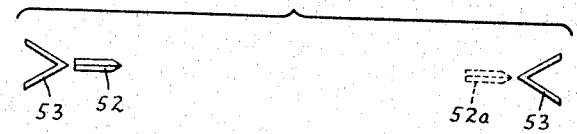
FIG.24.
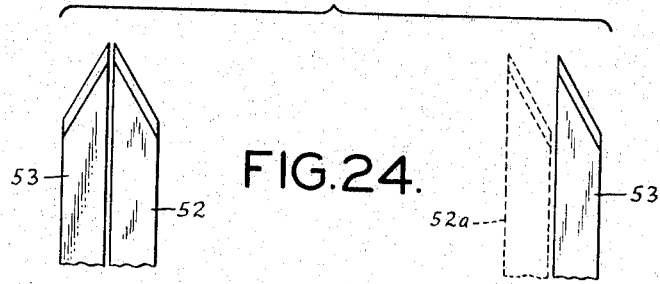
INVENTOR
ANTHONY G. TUCCI
BY
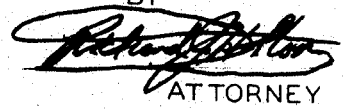
ATTORNEY

United States Patent Office 3,335,682
Patented Aug. 15, 1967

---

3,335,682
POCKET MACHINE
Anthony G. Tucci, 9602 103rd Ave.,
Ozone Park, N.Y. 11429
Filed Aug. 13, 1964, Ser. No. 389,370
8 Claims. (Cl. 112—2)

This invention relates to machinery for use in the manufacture of garments and the like. In particular, this invention relates to a machine for the manufacture of pockets, buttonholes and the like.

For many years, in the manufacture of men's and women's clothing and the like, the making of pockets was invariably done manually by a series of operations which included sewing a preformed blank pocket to the outer face of a garment part, slitting the garment part to make a pocket slash, turning the pocket blank through the slash, sewing around the pocket blank to close it, and stitching the ends of the slash to finish the pocket and prevent it from readily being turned inside-out, i.e. being drawn back through the slash, except to a limited extent incapable of destroying the pocket structure.

The manual process is performed in numerous variations, depending primarily on the type of pocket desired. In most cases, the preformed blank consists of at least two layers, one being a conventional white or unbleached pocketing material such as muslin or the like, and the other a facing of material selected to match or harmonize with the material of the garment, so as to prevent the sight of the pocketing material from marring the appearance of the garment when the pocket is slightly open for any reason.

In many cases, a flap is desired. The flap is customarily sewn to the body of the garment as a separate piece, in the same sewing operation whereby the pocket is sewn to the garment body.

In a slash pocket, it is customary to provide a welt along the lower edge of the pocket opening, and frequently along the upper edge as well. Flap pockets are also usually provided with a welt along the lower edge, and sometimes along the upper edge, above the flap. Such a pocket may be worn either way, presenting the appearance of a flap pocket when the flap is left out and that of a slash pocket when the flap is turned inside the pocket by the wearer. The welt is provided by placing a strip of matching material on the face of the garment with its nearer edge aligned with or slightly spaced from the pocket slash line, doubling the strip forwardly on itself toward and over the slash along a line approximately ½-inch from the slash line, sewing the doubled piece to the face of the garment along a line approximately ¼-inch from the slash line, passing the free edge through the slash, and turning the doubled welt along the stitch line up toward the slash line.

In some cases, for example a man's outside breast pocket, a different type of welt is employed, usually on the lower edge of the pocket, namely an upstanding "flap," usually about ¾-inch wide, which stands up from the bottom edge of the pocket slash. This type of welt is usually preformed by doubling the end of a piece of the garment material upon itself, right side inward, sewing it together on the ends, and turning the so-formed sack-like structure inside out. The resulting preformed welt is then sewn to a piece of pocketing, and the resulting preformed pocket assembly is placed on the garment with the bottom of the welt near the slash line and the top edge extending downwardly away from the slash line, and stitched to the body of the garment near the slash line. The pocketing is then turned through the slash and the welt moved from its downwardly-extending to an upwardly-extending position covering the slash line, and its sides stitched to the garment body. A second piece of pocketing is sewn to the garment body adjacent the top of the slash line, and the upper and lower pieces of pocketing are sewn together and around the edges to close the pocket.

A welted button hole, of the type commonly used in women's garments and less commonly in men's wear, is made in a manner entirely similar to that above described for the productios of a narrow-welted slash pocket, except that, in this case, the pocketing is omitted, and only the welting pieces are used.

All of the above operations are somewhat time-consuming, and require a considerable degree of skill on the part of the operator, and they therefore add appreciably to the cost of the garment. For this reason, a demand has arisen for machinery and methods to simplify and render less costly the production of pockets of various kinds and welted buttonholes.

Certain machines have been designed and built for the purpose of carrying out the production of pockets, and in some cases have achieved considerable acceptance and wide usage in the trade. Although very successful, such machines are in general not sufficiently flexible and versatile to carry out all of the above mentioned operations, so that a continuing demand exists for machinery capable of carrying out a wide variety of pocketing and buttonholing operations with a minimum of manual operation.

An object of this invention, therefore, is to provide improved apparatus for pocketing, buttonholing and similar operations.

Another object is to provide apparatus of the type described, which is capable of making various pocket and buttonhole types in any desired sequence, with a minimum of modification or adjustment to the apparatus in going from one type of operation to another.

A feature of the present invention is the use of a conveyor belt feeding mechanism to transport the work through the apparatus.

Another feature of the invention is the provision of a plurality of stations for sequentially performing the several required operations at spaced points along the path of the feed belt.

Other objects, features and advantages will become apparent from the following more complete description and claims, and with reference to the accomanying drawing, in which parts appearing in more than one view have been given the same reference numeral throughout.

In one particularly desirable embodiment, this invention contemplates apparatus for preparing an aperture in an article of clothing or the like, said apparatus comprising in combination a generally horizontal supporting surface, a pair of spaced conveyor belts disposed to traverse said surface, means for clamping a first workpiece onto said belts near the outer edges thereof, means for clamping a second workpiece onto said belts near the inner edges thereof and over said first workpiece, means for slitting said second workpiece into two parts along a line generally parallel with the edges of said belts, means for sewing said two parts of said second workpiece to said first workpiece, and means for cutting a slash in said first workpiece along a line generally parallel with the edges of said belts.

Referring now to the figures:

FIGURE 7 is a cross-sectional detail taken along line 7—7 of FIGURE 1.

FIGURE 8 is a cross-sectional detail taken along line 8—8 of FIGURE 1.

FIGURE 9 is a cross-sectional detail of a finished pocket.

FIGURE 10 is a cross-sectional detail, similar to FIGURE 3, showing the apparatus set up for the production of a second type of pocket.

FIGURE 15 is a cross-section similar to FIGURES 12–14 showing the final stage in the setup for said third type of pocket.

FIGURE 16 is a cross-setion of the type of pocket produced when the apparatus is set up in accordance with FIGURES 12–15.

FIGURE 17 is a cross-sectional detail showing the manner in which the apparatus is set up to produce a fourth type of pocket.

FIGURE 18 is a cross-section of the pocket produced by the setup of FIGURE 17.

FIGURE 19 is a cross-sectional detail showing the manner in which the apparatus is set up for the production of a fifth type of pocket.

FIGURE 20 is a cross-section of a partially finished pocket produced by the setup of FIGURE 19.

FIGURE 21 is a cross-section of a finished pocket produced by the setup of FIGURE 19.

FIGURE 22 is a view showing the configuration of the pocket slash in plan.

FIGURE 23 is a plan view showing the configuration of the cutting knives.

FIGURE 24 is a side elevation of the cutting knives.

Figure 1:
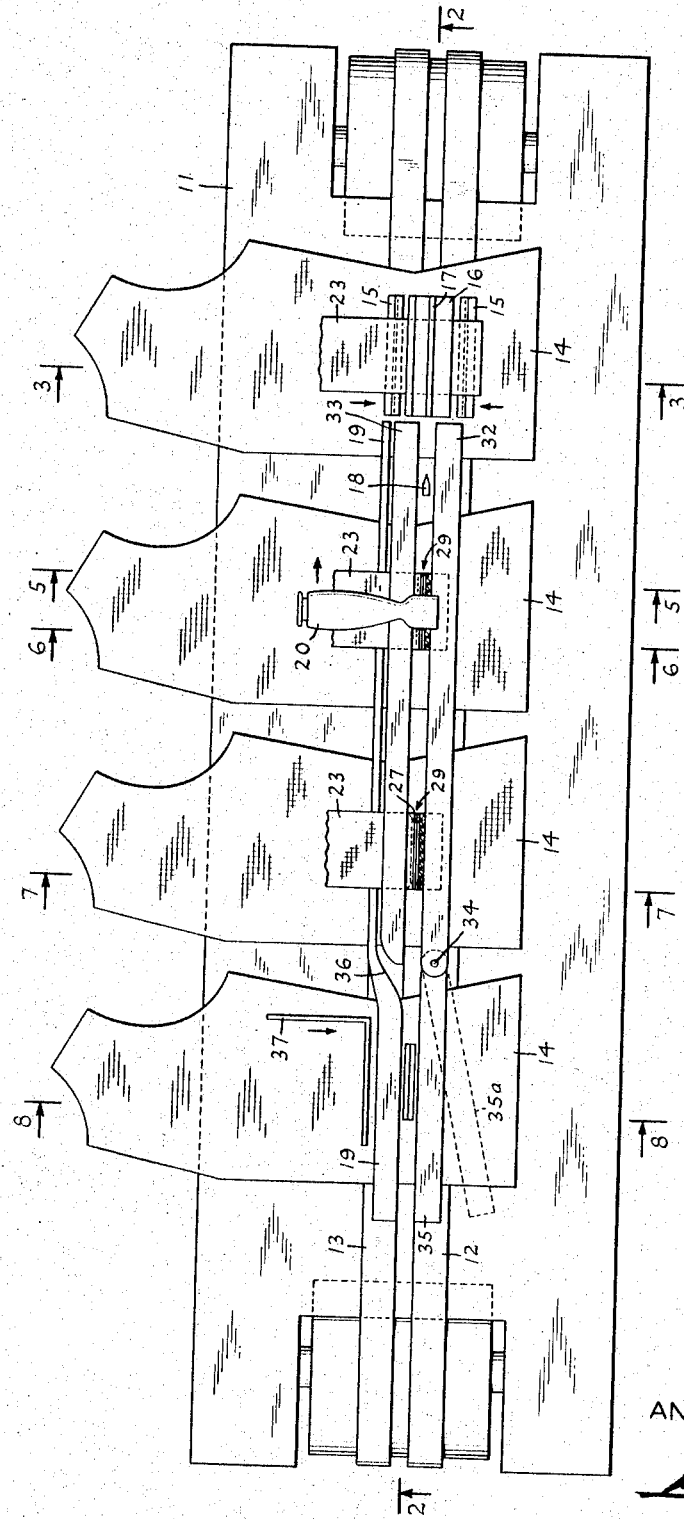
FIGURE 1 is a top view of an apparatus according to an embodiment of this invention.

As shown in the drawings, the apparatus comprises a supporting surface in the nature of a table 11, provided with means represented by belts 12, 13, for transporting workpieces over the surface of table 11. The workpieces are represented by jacket front pieces 14, which are shown in FIGURE 1 but omitted from FIGURE 2 for purposes of better illustration. Four jacket fronts 14 are shown in FIGURE 1 for the purpose of showing different stages in the processing of a workpiece. It will be understood, however, that so many workpieces will not necessarily be undergoing processing at any one time.

Toward the feed end of the apparatus, which is the right-hand end pair of clamps, or shoes, 15, adapted to be brought down toward the belts to press a workpiece against the outboard edges of belts 12, 13. The raising and lowering of shoes 15 is under the control of the operator, and is effected by any conventional type of linkage (not shown), such as a system of levers, a weight-and-chain arrangement, or a hydraulic system, for example.

Figure 2:
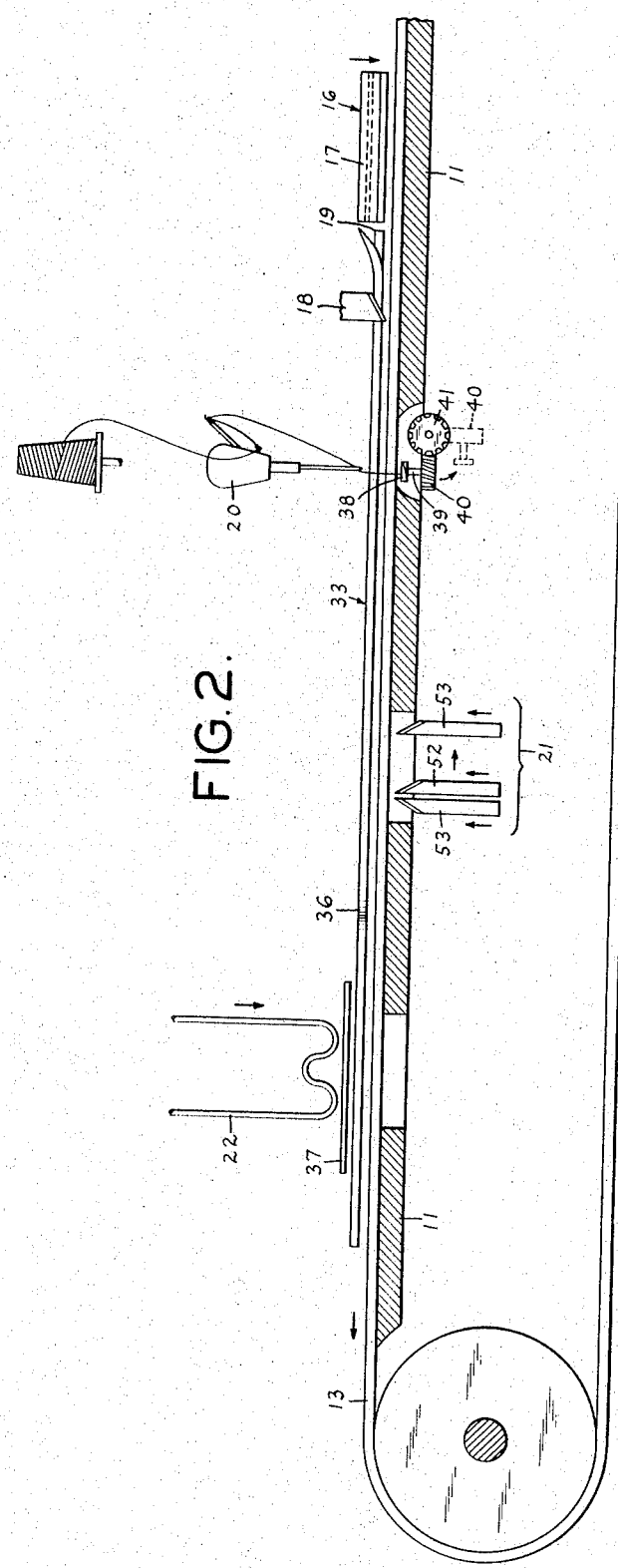
FIGURE 2 is a cross-sectional side elevation of the apparatus of FIGURE 1, taken along line 2—2 of FIGURE 1.

Between shoes 15 is another shoe 16, adapted to be brought down toward the belts, as indicated by an arrow in FIGURE 2, to press a workpiece against the inboard edges of belts 12, 13. Shoe 16 is provided with an upstanding flange 17, for a purpose which will presently be described. Shoe 16, like shoes 15, is raised or lowered by the operator, using any type of conventional controls (not shown).

Figure 3:
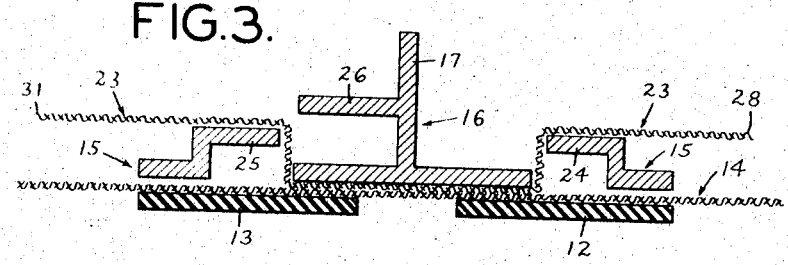
FIGURE 3 is a cross-sectional detail, on a larger scale, of a portion of the apparatus shown in FIGURES 1 and 2, taken along line 3—3 of FIGURE 1.
Figure 4:
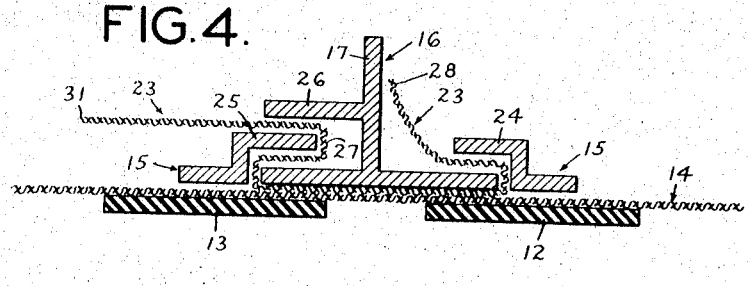
FIGURE 4 is a cross-sectional detail, similar to FIGURE 3, also taken along line 3—3 of FIGURE 1, showing the apparatus at a slightly later stage in the operating cycle.
Figure 5:
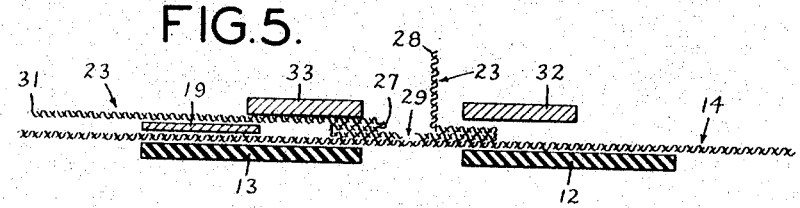
FIGURE 5 is a cross-sectional detail taken along line 5—5 of FIGURE 1.
Figure 6:
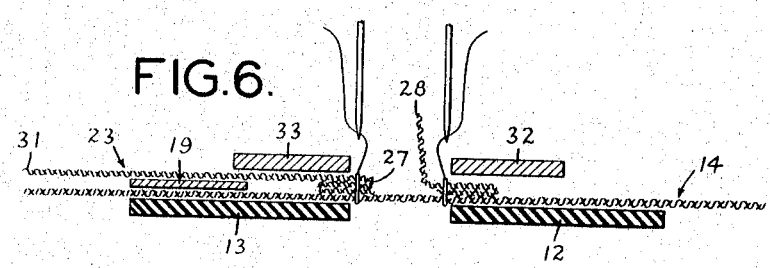
FIGURE 6 is a cross-sectional detail taken along line 6—6 of FIGURE 1.

On the inboard margins of shoes 15 are raised portions forming a pair of folders in the form of blades 24 and 25. The shoes 15, with blades 24 and 25, are adapted to move inwardly as indicated by the arrows (FIGURE 1) to create appropriate folds in the pocket assembly so as to prepare it for the subsequent sewing operation. The operation of blades 24 and 25 is more clearly illustrated in FIGURES 3 and 4. As shown in the latter figures, upstanding flange 17 on shoe 16 is provided with a generally horizontal projecting blade 26. Blade 25 moves horizontally into the space between blade 26 and the upper surface of shoe 16, carrying with it a fold 27 of material of the pocket blank, as best shown in FIGURE 4. At the same time, blade 24 folds the opposite edge 28 of the pocket blank over upon itself, as also shown in FIGURE 4. Upstanding flange 17 prevents the doubled edge 28 of the pocket blank from dropping down to overlie the central area wherein the pocket is to be formed.

Closely adjacent the discharge ends of shoes 15 and 16 (as well as of blades 24, 25 and 26), lie the feed ends of a pair of retaining shoes 32, 33, and of a separation holder 19. Retaining shoes 32 and 33 are turned up and receive the work in folded configuration from shoes 15 and 16 and their respective shaping blades, and hold the folded work against belts 12, 13. Separation holder 19 is not turned up, and is positioned to enter the space between garment front 14 and the pocketing material, preserving a separation between them.

Between retaining shoes 32 and 33, and near their respective feed ends, is a slitter 18, positioned to slit the upper layer of cloth, without disturbing the lower layer. This is one convenient location for the slitter. If desired, however, it may be located at any other convenient point, either before or after the sewing station.

The vertical disposition of the edge 28 of the pocket blank, resulting from the presence of upstanding flange 17, prevents it from falling into the path of slitter 18, so that the cutting is confined to that portion of the pocket blank overlying the area where the pocket is to be formed.

If desired, the apparatus may have metal fingers or the like (not shown) to separate the two layers of cloth, thus making it easier to slit the upper layer without disturbing the lower.

The sewing zone, or station, is the area within which sewing head 20 operates. Sewing head 20 is a conventional double-needle machine, so disposed that one of the two needles penetrates the surface plane of table 11 just inboard of the inboard edge of belt 12, and the other penetrates said plane just inboard of the inboard edge of belt 13. The sewing head is equipped with means (not shown) for causing the head as a whole to move along a line parallel with the belts. The means for moving the sewing head over a stationary workpiece is of any conventional design, as exemplified by those used on many commercial button hole, pocket, and other special-purpose machines. The distance through which the head travels is substantially the length of the pocket being fashioned, and is preferably made adjustable to accommodate pockets of various lengths. The means provided for causing this movement of the sewing head is also preferably provided with means for causing a short reciprocation at each end of the travel, so as to "tack" the ends of the seam by sewing back over it for a short distance.

In connection with the sewing operation, a particularly advantageous arrangement for the thread-catching hooks is indicated in FIGURE 2. In accordance with the conventional construction of two-needle sewing machines, the apparatus of this invention is provided with a pair of thread-catching hooks 38, each of which is disposed to rotate in a horizontal plane near the lowest point reached by one of the needles. These may be chain-stitch or lock-stitch hooks as desired, depending on the type of seam desired. Ordinarily, however, the lock-stitch provides a more desirable type of seam for the kinds of work usually done by the apparatus. If the hook is a lock-stitch hook, it is necessary to provide it with a bobbin (not separately shown) to provide the second thread needed to form a lock-stitch. In conventional practice, the bobbin is replaced when its supply of thread is exhausted, by opening a sliding door in the table surface of the machine and replacing the bobbin from above. In the apparatus of this invention, however, this mode of operation would be rather inconvenient, owing to the presence of belts 12 and 13. I therefore prefer to use the hook arrangement shown in FIGURE 2. This hook arrangement comprises a hook 38 on a shaft 39. Also on shaft 39 is a driven helical gear 40, which meshes with driving helical gear 41, which in turn takes its power in any conventional manner from the main sewing machine drive.

Releasable means (not shown) are provided for locking the assembly in the operative position shown in solid lines in FIGURE 2. On release of said releasable locking means, shaft 39, with hook 38 and driven gear 40, may be swung down to the position shown in dotted outline, thus providing room for the insertion of the bobbin. It will be noted that swinging the hook down in this manner does not require disengagement of gear 40 from gear 41, so that the synchronization of the hook with the needle is not disturbed. Suitable means (not shown) are preferably provided, for preventing accidental disengagement of the gears. Such means may, for example, be in the form of a confining housing or a yoke pivotally uniting the axes of the two gears.

Further along in the direction of belt travel is a cutting station, in which the pocket slash is cut in the garment front. This is accomplished by means of a cutting knife assembly generally indicated at 21. Cutting knife assembly 21 may comprise a single knife or die having a straight cutting edge of a length to cut a slash the length of the pocket, and having at each end a pair of short cutting edges diverging from the end of the main cutting blade. For ease in maintaining the sharpness of the blades, however, it is frequently preferable to provide a main cutting blade such as blade 52, to cut the longitudinal slash, and a pair of V-shaped cutting blades 53 to provide the short diverging slits at either end of the main slash. Main cutting blade 52 may be a vertically-reciprocating blade having a cutting edge of a length to cut the entire slash with one vertical motion. I generally prefer, however, to provide a blade with a relatively short cutting edge such as blade 52, and provide means (not shown) for causing the blade to move in a horizontal direction while reciprocating vertically, as indicated by the two arrows associated with blade 52 in FIGURE 2.

The configuration, motion and effect of the cutting blades are more fully illustrated in FIGURES 22–24. As shown in FIGURE 22, the pocket slash comprises a longitudinal cut 30 connecting at each end with a pair of short diverging cuts. The V-cutting knives 53, as illustrated in FIGURE 23, are a pair of dihedral knives each having two sides forming a V in horizontal cross-section, both sides being sharpened along their upper edges. The main cutting blade 52 is a single blade, beveled to a sharp point at its upper end and provided with a sharp edge along its entire upper side. Blade 52, in the preferred embodiment, is also provided with means (not shown) for moving it horizontally a distance substantially equal to the longitudinal part of the slash to be cut (i.e. to the position shown in dotted outline at 52ª in FIGURES 23 and 24).

Finally, near the discharge end of the apparatus, there is a verticaly-reciprocating flat plunger 22, adapted to force a partially formed pocket through the pocket slash.

In operating the apparatus, the operator first places face up on the belts a workpiece, namely the garment part in which the pocket is to be inserted (for example a jacket front 14). Shoes 15 are then brought down to clamp the workpiece against the outer edges of belts 12 and 13. The operator then drops a pocket assembly 23 onto workpiece 14, in position to put over the space between the belts that portion of pocket assembly 23 which is to be slit. The operator then clamps pocket assembly 23 down on workpiece 14 and the inboard edges of the belts by lowering shoe 16.

The folding operation is then effected by moving shoes 15 inwardly so that they, and their associated blades 24 and 25, assume the position shown in FIGURE 4. In this process blade 24 folds over the edge 28 of the pocket blank, while blade 25 picks up a fold 27 from the other side of the blank, as shown in FIGURE 4.

The belt is then advanced to carry the work to the sewing zone, which is the region underlying sewing head 20. On the way to the sewing zone, the pocket blank is slit by slitter 18 to divide it in two along a line 29 overlying the eventual position of the pocket slash. In the sewing zone, the pocket blank is sewn to the face of the body piece 14 by two lines of stitching, each lying adjacent the inner edge of one of belts 12 and 13. One line of stitching passes through fold 27 and unites the larger portion of the pocket blank to the portion of garment front 14 which is destined to become the upper margin of the finished pocket. The other line of stitching unites the smaller portion of the pocket blank to the portion of garment front 14 which is to become the lower margin of the pocket. The latter, smaller portion of the pocket blank eventually forms the welt along the lower side of the pocket slash. The operation of the sewing head may be started and stopped by the operator (or a second operator). Preferably, however, the machine is so set up that cycling of the sewing head (and of the various operating mechanisms in the cutting and turn-through stations) takes place automaticaly, each time the belts are advanced far enough to carry a workpiece assembly from one operating station to the next. If desired, auxiliary sensing means, such as photocells, microswitches or the like may be provided, to inactivate the operating mechanisms in any station not occupied by a workpiece. Whether manually or automatically controlled, the sewing head is caused to start at the forward end of the pocket position, and move to the rear end thereof (i.e. toward the feed end of the machine), sewing two lines of stitching as it goes.

The direction in which the sewing head travels in forming the stitch lines is not critical and, if desired, the stitching may be done in that part of the cycle in which the sewing head is moving away from the feed end and toward the discharge end of the apparatus. One of the two lines sews the welting piece to the garment from on the left side of the slit (as viewed from the feed end of the machine) and the other sews the edge of fold 27 to the garment front on the other side of the slit (i.e. the right side as viewed from the feed end). Preferably, the sewing head also makes a slight jog at the beginning and end of the cycle, in order to tack each end of each of the two lines of stitching. The apparatus is also preferably provided with means (not shown) for clipping the thread at or near the end of each of the two lines of stitching just described.

After the two portions of the pocket blanks are sewn to the base piece (e.g. garment front 14), the belts are once more advanced to the next position, where one or more knives, such as knives 52 and 53, advance upwardly through the space between the belts, and form the pocket slash proper 30, in garment front 14.

The belts are then advanced further to place the work at the next, or turn-through, station. On the way to the turn-through station, or as a first operation upon reaching it, edge 28 of the welting side (i.e. the left side as viewed from the feed end) is dropped over the pocket slash, and free end 31 of the pocketing material is also lapped over the pocket slash. This may be done in any convenient manner, including manual operation. One very convenient method is shown in the drawings. On the left side (i.e. the lower side as seen in FIGURE 1), retaining shoe 32 terminates in a pivotal connection 34. Pivotal connection 34 unites the end of retaining shoe 32 with the end of a shiftable hold-down 35. Shiftable hold-down 35 is provided with means (not shown) for swinging it outwardly in a horizontal plane to the position shown in dotted outline at 35ª (FIGURE 1). In so swinging, hold-down 35 moves out far enough to clear the folded welt. Hold-down 35 is then moved back to its original position and in so doing, pushes the welt inward the pocket slash, as best shown in FIGURE 8.

In lieu of a pivotal connection to shoe 32, shiftable hold-down 35 may be separately supported, and arranged to move laterally outward to a position substantially parallel with its original position and then return. The free edge 28 of the welting piece would normally tend to fall over the slash in any event, but the action of shiftable hold-down 35 in pushing the fold of the welt gives a positive impetus urging it to do so.

On the other side of the slash line, the preferred embodiment shown in the drawing takes a somewhat different form. Separation holder 19 extends down the side of the apparatus, maintaining a separation between garment front 14 and the pocketing material. Throughout most of its extent, separation holder 19 is passive, and merely maintains the separation between the two portions of the garment assembly. As it approaches the turn-through station, separation holder 19 is curved inwardly as shown at 36 (FIGURE 1), to occupy the position previously occupied by retaining shoe 33. As the workpiece passes this portion of separation holder 19, the inner edge of the curved portion pushes the welt fold on that side of the pocket inwardly toward the slash, as indicated in FIGURE 8.

On the same side as separation holder 19 is a pocket-pusher 37, in the form of a horizontal bar generally parallel with the direction of travel of the belts, and provided with means (not shown) for moving it horizontally across the pocket slash line, as indicated by the arrow in FIGURE 1. In so moving, pocket-pusher 37 urges the extending flap of pocketing material inwardly so that it overlies the slash line. Turn-through plunger 22 is moved downwardly to and through the slash, carrying the flap of pocketing material and the free edge 28 of the welting material with it, as shown in FIGURE 8. Plunger 22 is then retracted to its position above the belts, and pocket-pusher 37 is returned to its original position.

The next advance of the belts then carries the workpiece to the discharge end of the apparatus and deposits it on a suitable stacking table or the like (not shown).

The pocket is then finished by an operator, who turns the base piece over, sews the free edge 31 of the pocketing material to the free edge 28 of the welting material, and sews around the edges of the loop of pocketing so formed, thus closing the pocket. Preferably, the operator may also sew a short crosswise tack at each end of the pocket slash, but this step may be dispensed with, if desired, or combined with the sewing-around operation.

From the foregoing description it will be apparent that the various operations that go into forming a pocket are performed sequentially at a series of stations spaced along the length of the table. In manual making of pockets, as well as in pocket making with the aid of machines heretofore proposed, the various operations are carried out sequentially, or to some extent simultaneously, at a single position. The use of a number of spaced operating stations, according to the present invention, simplifies the design of the machine, and also makes it possible to work on several workpieces at once, as rapidly as they can be fed and positioned by the operator. To this end, it is desirable to activate the sewing and subsequent operations by making them responsive to the movement of the belts. In this way, when the operator has positioned a pocket assembly in the first, or folding position, he starts the apparatus, which action results in (1) actuating the folders, and (2), advancing the folded piece to the sewing station. At the same time, each workpiece already in the machine advances to the next station. The operating mechanisms (sewing head, cutting knives, etc.) are responsive to the belt advance, so that when the belt is advanced, each station performs an operating cycle. Preferably, the apparatus is provided with sensing means such as photocells or microswitches, to deactivate the operating mechanism in any station where there is no workpiece.

The foregoing description has been devoted primarily to the production of a basic form of pocket, namely a double-welt slash pocket. Such a pocket has a welt along the bottom edge, formed by stitching to the garment front a downwardly directed U-shaped fold of welting material, and then inverting the U-shaped fold so that the base of the U is turned up to substantially coincide with the slash line. It also has a welt along the top edge of the pocket, formed by making a pleat in the pocketing material (which carries a facing of welting material) sewing one edge of the pleat to the garment front, and then turning the other edge of the pleat down to substantially coincide with the slash line (the rest of the pocketing material being turned through the slash).

The apparatus of this invention is capable of producing many variations and alternative constructions, in addition to the double-welt slash pocket to which the foregoing description has been devoted. For example, a popular style of pocket has a single welt along the lower margin of the slash, and a flap attached to the garment body and hanging down over the slash, with no welt on the upper margin. Such a pocket may be made using the apparatus of this invention, as illustrated in FIGURE 10. FIGURE 10 illustrates the initial setup of the work, and corresponds in general to FIGURE 3. Garment front 14 is laid on belts 12, 13 as in making the double-welt pocket, followed by pocket flap 42. Pocket flap 42 is placed on the garment front 14 face down, i.e. with the "good" side of the flap in contact with that of the front. Although shown in FIGURE 10 as a single ply of material, flap 14 will normally have a facing material presewn to its reverse side.

Figure 11:
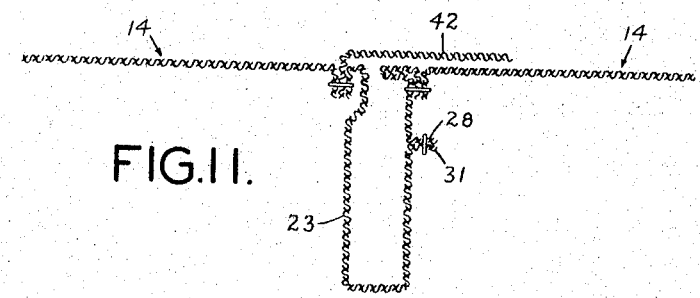
FIGURE 11 is a cross-section of a pocket produced in accordance with the setup of FIGURE 10.

Pocket piece 23 is then placed atop the front and the flap and clamped in place. On the lower margin of the pocket (the right side of FIGURE 10) the pocketing lies under shoe 16, and over shoe 15 and blade 20, as previously described in connection with the double welt pocket. On the upper margin, however, the pocketing material is placed under both of shoes 15 and 16, as the function of blade 25 in forming a welt fold is dispensed with in this operation. The apparatus is operated in substantially the same manner as previously described, but because of the way the workpiece is originally set up in the machine, the resulting pocket is of the type illustrated in FIGURE 11.

When it is desired to produce a convertible pocket, i.e. one having a flap which may be worn inside or outside, it is customary to provide a welt along the upper margin of the pocket slash, above the flap, so that when the flap is turned in, the pocket presents the appearance of a simple double-welt slash pocket. Such a pocket may also be readily produced by the apparatus of the present invention, as illustrated in FIGURE 12–15. For this mode of operation, it is convenient to replace the shoe 16 as previously described and shown, with a modified shoe 16ª, similar in form except that it does not have the horizontally-projecting blade 26. Also, shoe 15 is replaced on one side with a modified shoe 15ª, and two additional shoes 56 and 57 are provided, for a purpose which will presently become apparent.

Figure 12:
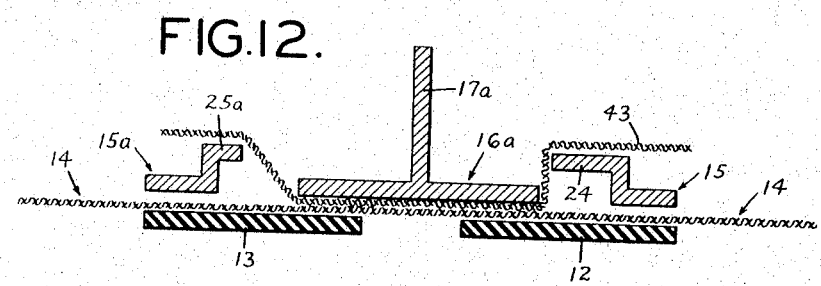
FIGURE 12 is a cross-sectional detail showing the first stage in setting up the apparatus for the production of a third type of pocket.
Figure 13:
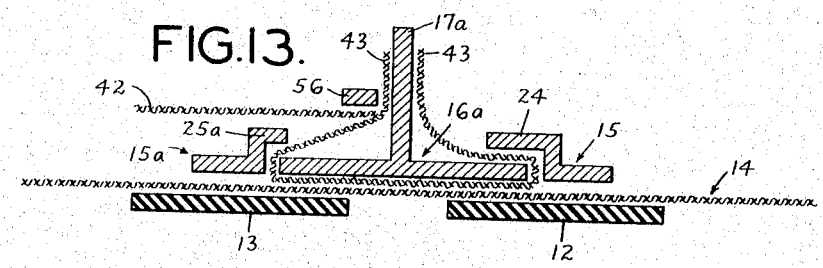
FIGURE 13 is a cross-sectional, similar to FIGURE 12, showing a later stage in the setting up of the apparatus for said third type of pocket.
Figure 14:
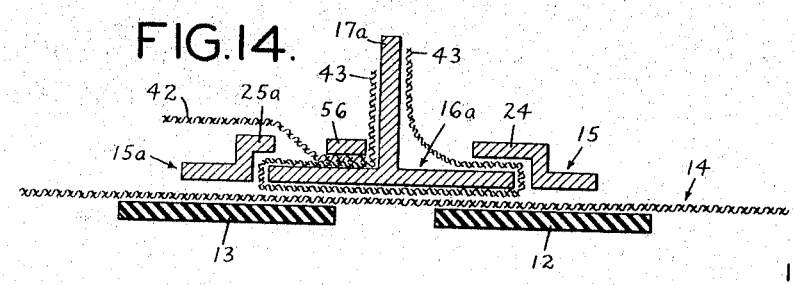
FIGURE 14 is a cross-section similar to FIGURES 12 and 13, showing a still later stage in setting up the apparatus for said third type of pocket.

In setting up the apparatus for the manufacture of a convertible pocket, the operator first places on the belts a garment front 14, as previously described, and clamps it down with shoes 15 and 15ª. Shoe 15ª is similar to shoe 15, except that its horizontal shaping blade 25ª is somewhat narrower than blade 25 on shoe 15, and does not extend as close to vertical flange 17, even when shoe 15ª is moved to the inner position. A welting piece 43 is then placed on the belts over shoes 15 and 15ª, and clamped down by shoe 16ª, as shown in FIGURE 12. Flap 42 is then placed over shoe 15ª and clamped down by shoe 56, as shown in FIGURES 13 and 14. Shoe 56 is of a width to fit between the extremity of blade 25ª and flange 17, as shown best in FIGURE 14.

Pocketing 23 is then placed atop 15ª and shoe 56, and clamped down by means of shoe 57, as shown in FIGURE 15. At this point, shoe 15ª is withdrawn to its original position to avoid interference with shoe 57, as shown in FIGURE 15. The assembly of workpieces is then carried forward under shoes 32 and 33, and the remainder of the apparatus functions in the manner previously described, to produce a convertible pocket having the cross-sectional configuration shown in FIGURE 16.

When it is desired to form a slash pocket with a single upstanding welt on the bottom margin (for example the outside breast pocket in a man's suit), a preformed welt is used, which is preferably sewn to a piece of pocketing material to form a pocket assembly having the general configuration shown in FIGURE 17, wherein 46 designates a single ply of pocketing material having attached thereto a preformed welt 47. For purposes of this mode of operation, neither blade 24 nor blade 25 comes into play, as there is no welt on the upper margin of the pocket, and that on the lower margin is preformed (i.e. welt 47). The remainder of the operation of the apparatus is substantially as already described, and the resulting pocket has the configuration shown in FIGURE 18.

For fine work, where it is desired to avoid any bulk in the garment in the area bordering the slash, an "open-besom" type of double-welt slash pocket is sometimes used. This type of pocket may be prepared on the apparatus of this invention by setting up the machine as illustrated in FIGURE 19, using, instead of a complete pocket assembly, a relatively narrow piece 48 of welting material.

After the slitting, stitching, slash-cutting and turn-through operations have been completed, the operator presses down the narrow pieces of material adjacent the seam lines so that they lie flat against the back of the garment front, as indicated at 51 (FIGURE 20). The free edges 50 of the welting material are then turned back to cover the pressed-down pieces, and sewn through the seam line, as indicated at 58 in FIGURE 21. The pocketing material is then sewn to the edges 50 of the welting material, and sewn around to complete the pocket.

The operation as just described can be carried out with the apparatus as hereinbefore described, without any modification. In a particularly preferred embodiment, this operation can be improved upon, by providing means, such as internal steam for example, for heating a portion of shoes 32 and 33 (or providing separate heated irons), to form a permanent crease instead of a temporary fold in the folded portions of the welting material i.e. at the points designated 59 in FIGURES 19, 20 and 21. This simplifies matters for the operator, who then is not required to locate the proper line for the fold of welting material which will lie adjacent the slash line in the finished pocket.

Although the apparatus of this invention has been described in terms of a machine having a separate station for each of the various major operations (folding, sewing, cutting, and turn-through), it will be appreciated that more than one operation may take place at a single station, without sacrificing the advantages of the sequential scheme of operation. For example, the sewing head and the cutting knife assembly may be arranged to operate at a single station without moving the workpiece between the two operations. As indicated in FIGURE 2, for example, the major portion of the sewing head mechanism is located above the plane of the belts, only the thread-catching hooks being below the belts. It is a simple matter, if so desired, to place the cutting knives between the hooks so that the slash-cutting operation and the sewing can be done at a single station, without moving the workpiece in between. If desired, these operations may even take place simultaneously.

Another permissible combination of more than one operation at a single station is to carry out the slash-cutting and the turn-through operations at a single location. As is also evident from FIGURE 2, the turn-through mechanism is located above the belts, while the cutting knives operate upwardly from below. If desired, the turn-through mechanism may be located above the cutting knife assembly, so that the pocket slash is cut and the pocket parts turned through the slash without moving the workpiece between the two operations.

Similarly it is possible to carry out the folding and sewing operations at a single station, by withdrawing shoe 16 longitudinally toward the feed end, after shoes 15 are in place. The workpiece then remains clamped against the belts in folded configuration, as the sewing head advances and sews two lines of stitching between shoes 15 and adjacent the inboard edges of the two belts.

From the foregoing description it will be apparent to those skilled in the art that the present invention provides improved apparatus for production of pockets, buttonholes and the like. The apparatus is of simple and inexpensive construction compared to previously available devices, and is characterized by greater flexibility of operation than pocket and buttonhole machines heretofore proposed. The operation of the apparatus is simple and does not demand a high degree of skill on the part of the operator.

While this invention has been described in terms of certain preferred embodiments and illustrated by way of certain drawings, these are illustrative only, as many alternatives and equivalents will readily occur to those skilled in the art, without departing from the spirit and scope of the invention. The invention is therefore not to be construed as limited, except as set forth in the appended claims.

I claim:

1. Apparatus for preparing an aperture in an article of clothing or the like, said apparatus comprising in combination a generally horizontal supporting surface, a pair of spaced conveyor belts disposed to traverse said surface, means for clamping a first workpiece onto said belts near the outer edges thereof, means for clamping a second workpiece onto said belts near the inner edges thereof and over said first workpiece, means for slitting said second workpiece into two parts along a line generally parallel with the edges of said belts, means for sewing said two parts of said second workpiece to said first workpiece, and means for cutting a slash in said first workpiece along a line generally parallel with the edges of said belts, said clamping means, said sewing means and said slash-cutting means being located adjacent said supporting surface in the order named, proceeding in the direction of travel of said belt, said means for slitting said second workpiece being located adjacent said supporting surface at an appropriate point between said clamping means and said slash-cutting means.

2. Apparatus for preparing an aperture in an article of clothing or the like, said apparatus comprising in combination a generally horizontal supporting surface, a pair of spaced conveyor belts disposed to traverse said surface, means for clamping a first workpiece onto said belts near the outer edges thereof, means for clamping a second workpiece onto said belts near the inner edges thereof and over said first workpiece, means for slitting said second workpiece into two parts along a line generally parallel with the edges of said belts, means for sewing said two parts of said second workpiece to said first workpiece, means for cutting a slash in said first workpiece along a line generally parallel with the edges of said belts, and means for forcing the outboard edges of said second workpiece through said slash in said first workpiece, said clamping means, said sewing means and said slash-cutting means being located adjacent said supporting surface in the order named, proceeding in the direction of travel of said belt, said means for slitting said second workpiece being located adjacent said supporting surface at an appropriate point between said clamping means and said slash-cutting means.

3. Apparatus for preparing an aperture in an article of clothing or the like, said apparatus comprising in combination a generally horizontal supporting surface, a pair of spaced conveyor belts disposed to traverse said surface, means for clamping a first workpiece onto said belts near the outer edges of said belts, means for clamping a second workpiece onto said belts near the inner edges of said belts and over said first workpiece, means for doubling a portion of said second workpiece upon itself in the general direction of the space between said spaced belts, means for slitting said second workpiece into two parts along a line generally parallel with the edges of said belts, means for sewing said two parts of said second workpiece to said first workpiece, and means for cutting a slash in said first workpiece along a line generally parallel with the edges of said belts, said clamping means, said sewing means and said slash-cutting means being located adjacent said supporting surface in the order named, proceeding in the direction of travel of said belt, said means for slitting said second workpiece being located adjacent said supporting surface at an appropriate point between said clamping means and said slash-cutting means.

4. Apparatus for preparing an aperture in an article of clothing or the like, said apparatus comprising in combination a generally horizontal supporting surface, a pair of spaced conveyor belts disposed to traverse said surface, means for clamping a first workpiece onto said belts, means for clamping a second workpiece onto said belts and over said first workpiece, means for forming a pleat in said second workpiece, said pleat extending in the general direction of the space between said spaced belts, means for slitting said second workpiece into two parts along a line generally parallel with the edges of said belts, means for sewing said two parts of said second workpiece to said first workpiece, and means for cutting a slash in said first workpiece along a line generally parallel with the edges of said belts, said clamping means, said sewing means and said slash-cutting means being located adjacent said supporting surface in the order named, proceeding in the direction of travel of said belt, said means for slitting said second workpiece being located adjacent said supporting surface at an appropriate point between said clamping means and said slash-cutting means.

5. Apparatus for preparing an aperture in an article of clothing or the like, said apparatus comprising in combination a generally horizontal supporting surface, a pair of spaced conveyor belts disposed to traverse said surface, means for clamping a first workpiece onto said belts, means for clamping a second workpiece onto said belts and over said first workpiece, means for forming a generally U-shaped bight in said second workpiece, the closed end of said bight extending generally away from the space between said spaced belts, means for sewing both sides of the open end of said bight to said first workpiece, means for slitting said second workpiece along a line lying in the space between said spaced belts, and means for cutting a slash in said first workpiece along a line lying in the space between said spaced belts, said clamping means, said sewing means and said slash-cutting means being located adjacent said supporting surface in the order named, proceeding in the direction of travel of said belt, said means for slitting said second workpiece being located adjacent said supporting surface at an appropriate point between said clamping means and said slash-cutting means.

6. Apparatus for preparing an aperture in an article of clothing or the like, said apparatus comprising in combination a generally horizontal supporting surface, means for transporting a first workpiece horizontally over said surface, means for holding a second workpiece on said first workpiece, means for slitting said second workpiece into two parts along a line substantially coinciding with the position in which said aperture is to be formed, means for sewing said two parts of said second workpiece to said first workpiece, and means for cutting a slash in said first workpiece along a line substantially coinciding with said slit in said second workpiece, said means for holding a second workpiece on said first workpiece, said sewing means and said slash-cutting means being located adjacent said supporting surface in the order named, proceeding in the direction of travel of said workpieces, said means for slitting said second workpiece being located adjacent said supporting surface at an appropriate point between said holding means and said slash-cutting means.

7. Apparatus for preparing an aperture in an article of clothing or the like, said apparatus comprising in combination a supporting surfacve, means for transporting a first workpiece over said surface, means for holding a second workpiece in at least partial contact with said first workpiece, means for slitting said second workpiece into two parts along a line substantially coinciding with the position in which said aperture is to be formed, means for sewing said two parts of said second workpiece to said first workpiece along a pair of seam lines spaced on either side of said slit and generally parallel therewith, and means for cutting a slash in said first workpiece along a line substantially coinciding with said slit in said second workpiece, said means for holding a second workpiece on said first workpiece, said sewing means and said slash-cutting means being located adjacent said supporting surface in the order named, proceeding in the direction of travel of said workpieces, said means for slitting said second workpiece being located adjacent said supporting surface at an appropriate point between said holding means and said slash-cutting means.

8. Apparatus for preparing an aperture in an article of clothing or the like, said apparatus comprising in combination a supporting surface, means for transporting a first workpiece over said surface, means for holding a second workpiece in at least partial contact with said first workpiece, means for slitting said second workpiece into two parts along a line substantially coinciding with the position in which said aperture is to be formed, means for sewing said two parts of said second workpiece to said first workpiece along a pair of seam lines spaced on either side of said slit and generally parallel therewith, means for cutting a slash in said first workpiece along a line substantially coinciding with said slit in said second workpiece, and means for forcing through said slash at least a portion of each of said two parts of said second workpiece, said portion being taken from the side of the seam line further from said slit, said holding means, said sewing means, said slash-cutting means and said means for forcing portions of said second workpiece through said slash being located adjacent said surface in the order named, proceeding in the direction of travel of said workpieces, said means for slitting said second workpiece being located adjacent said supporting surface at an appropriate point between said holding means and said slash-cutting means.

References Cited
UNITED STATES PATENTS

| | | | |
|---|---|---|---|
| 2,133,749 | 10/1938 | Lockwood | 2—247 |
| 2,388,516 | 11/1945 | Altobelli | 2—247 |
| 2,529,072 | 11/1950 | Bradford et al. | |
| 2,546,831 | 3/1951 | Newell | 112—252 X |
| 2,620,759 | 12/1952 | Pantusco et al. | 112—68 |
| 2,675,560 | 4/1954 | Bufardeci | 2—24 X |
| 2,825,907 | 3/1958 | Phillips | 2—247 |
| 3,083,653 | 4/1963 | McGill | 112—2 |
| 3,105,973 | 10/1963 | Stiefelmeir | 112—65 X |
| 3,178,000 | 4/1965 | Myska | 112—67 X |

JORDAN FRANKLIN, *Primary Examiner.*

J. R. BOLER, *Assistant Examiner.*